United States Patent Office 3,766,131
Patented Oct. 16, 1973

3,766,131
GLASS REINFORCED THERMOPLASTIC COMPOSITIONS WITH METALLOCENE COUPLING AGENTS
Barry C. Arkles, Malvern, Pa., assignor to Liquid Nitrogen Processing Corporation, Malvern, Pa.
No Drawing. Filed May 11, 1971, Ser. No. 142,353
Int. Cl. C08f 45/10
U.S. Cl. 260—41 AG       12 Claims

ABSTRACT OF THE DISCLOSURE

Thermoplastic resin composites reinforced with glass fibers and having improved mechanical and high temperature properties may be made by incorporating a small percentage of a metallocene coupling agent in the composite. Suitable metallocenes include titanocene, hafnocene and zirconocene dihalides; titanocene disulfonates; and stable derivatives thereof, any of which may be used with or without a conventional silane coupling agent. Stable ferrocene derivatives may also be used in combination with a reactive silane. The metallocene coupling agent may be applied directly to the glass fibers, or mixed with the thermoplastic resin or composite blend.

---

The present invention relates to glass reinforced thermoplastic compositions and methods for making the same. More particularly, the present invention is directed to thermoplastic composites reinforced with glass fibers and provided with metallocene coupling agents.

The use of composite thermoplastics, particularly those containing chopped glass fibers is expanding rapidly. More specifically, thermoplastic composites are penetrating engineering applications in which strength and high temperature properties are of great importance. Such applications include tool and machine housings, gears and connecting blocks, and many others.

A quite early development in the field of glass reinforced thermoplastics was the addition of a coupling agent to improve both mechanical properties and resistance to moisture. A coupling agent is a substance which can form a mechanical and/or chemical bond between the glass fibers and the thermoplastic resins. In the current state of the art, a physio-chemical linking agent is most commonly applied to the glass fibers as a sizing. Nearly all of such coupling or linking agents are silanes.

The silanes are ambifunctional compounds, containing groups which are easily hydrolyzed and replaced by siloxane linkages to the glass fibers and groups that have a specific reactivity toward the thermoplastic resin. As an example, gamma (δ)-Aminopropyltrimethoxysilane is often used in glass fiber reinforced thermoplastic composites wherein nylon 6 is the thermoplastic resin.

Although silane coupling agents function exceedingly well in many applications, several deficiencies are apparent. Thus, in many systems the composite produced does not result in optimum theoretical reinforcement. Moreover, in high temperature resin systems the silanes degrade in processing, and a coupled composite system is not achieved. Particularly difficult coupling problems are encountered with reinforced polypropylene composites.

Accordingly, it is an object of the present invention to provide glass fiber reinforced thermoplastic compositions having improved mechanical and physical properties.

It is a further object of the present invention to provide glass fiber reinforced thermoplastic compositions having improved high temperature properties.

It is a still further object of the present invention to provide an improved coupling agent for glass fiber thermoplastic resin systems.

It is another object of the present invention to provide an improved method for reinforcing thermoplastic compositions with glass fibers to produce composites having excellent mechanical and high temperature properties.

Other objects will appear hereinafter.

The above and other objects are achieved by the reinforced thermoplastic compositions of the present invention which comprise about 40 to 95 weight percent of a thermoplastic resin, about 5 to 60 weight percent of glass fibers, and about 0.05 to 5.5 weight percent of a coupling agent which includes a metallocene. Suitable metallocenes include titanocene, zirconocene and hafnocene dihalides; titanocene disulfonate; stable derivatives of the foregoing; and stable ferrocene derivatives. The ferrocene derivatives must be used in combination with a silane coupling agent which will react with the ferrocene derivative, the silane preferably being an alkoxysilane or an acryloxysilane. The remaining metallocenes may be used with or without a traditional silane coupling agent.

The metallocene coupling agent may be applied directly to the glass fibers prior to blending with the thermoplastic resin, or the metallocene may be mixed with the thermoplastic resin prior to or during the blending with the glass fibers.

Virtually any thermoplastic resin which may be conventionally reinforced with glass fibers may be used in the reinforced thermoplastic compositions of the present invention. Such thermoplastic resins include polystyrene, polypropylene, polyvinyl chloride, thermoplastic urethanes, polyimides, and the nylons including nylon 6/10, nylon 6/6, nylon 6, nylon 6/12, nylon 6/9, nylon 11, and nylon 12. Other thermoplastic resins conventionally used in reinforced composites for various molding operations will be readily apparent to those of ordinary skill in the art.

Traditional glass reinforced thermoplastic compositions generally contain about 40 to 95 weight percent of a thermoplastic resin and about 5 to 60 weight percent of glass fibers, although these ranges may be broadened for special applications. In addition, conventional reinforced thermoplastic composites include small amounts of coupling agents and may include various percentages of additional inert components such as pigments, fillers, etc.

It will be understood by those of ordinary skill in the art that in order to be suitable for formation of glass reinforced composites, the glass must be fibrous. Although fibrous glass is provided in many forms, including glass fiber mats, spun roving, etc., continuous glass roving and chopped glass strands are generally preferred.

At present, virtually all commercially available glass fiber is sold with one or more sizing ingredients already applied. Such sizing ingredients may include a lubricating agent to prevent chafing of glass fibers by mechanical contact and a cementitious material such as polyvinyl alcohol as a film former. In addition, glass fibers to be incorporated in the reinforced thermoplastic composites of the present invention may be treated with traditional coupling agents, typically silanes, as discussed more fully below.

The improved coupling agents of the present invention are selected from the general class known as metallocenes. Metallocenes are cyclopentadienyl derivatives or complexs of transition metals or transition metal halides. Particularly important for the present invention are the dicyclopentadienyl complexes [e.g., $(C_5H_5)_2M$ or $(C_5H_5)_2MX_{1-3}$, where M is a transition metal and X is a halogen] wherein the transition metal or transition metal halide is sandwiched between the two aromatic cyclopentadienyl rings and is bonded by a coordinated bond, usually referred to as a pi bond.

The metallocenes are capable of forming a chemical and/or mechanical link to thermoplastic resins. In addition, many metallocenes are capable of bonding directly to glass fibers, and others are capable of bonding indirectly to glass fibers through a silane coupling agent.

The metallocene compounds which are capable of linking directly to glass, and which do not need silane coupling agents, include titanocene dihalides, zirconocene dihalides, hafnocene dihalides, and titanocene disulfonate. While titanocene, zirconocene or halnocene dichlorides are particularly preferred, other hafogen containing metallocenes, including diiodides, dibromides and difluoroides will behave analogously and may be used in a similar manner. In addition, stable ring substituted derivatives of the titanocenes, zirconocenes and hafnocenes may also be employed, an example being zirconocene dichloride 1,-sulfonate. Other metallocenes are capable of linking to a thermoplastic resin, but do not have a great affinity for glass. Such metallocenes, which include the ferrocene derivatives, must be used in combination with other coupling agents, such as the traditional silane coupling agents, in order to produce an indirect link to the glass fibers. Examples of suitable ferrocene derivative coupling agents include ferrocenoyl chloride; ferrocene $1,1^1$- dicarboxylic acid; ferrocene $1,1^1$ diamine; $1,1^1$ di-(chloromercuri) ferrocene; $1,1^1$ dihydroxymethyl ferrocene and $N,N^1$ dimethylaminomethyl ferrocene. Other suitable ferrocene derivatives may be determined by those of ordinary skill in the art.

In order to provide the desired indirect link between the ferrocene derivative and the glass fibers, it is necessary to choose an intermediate coupling agent which is capable of reacting with the ferrocene derivative. Suitable silane coupling agents include the typical alkoxysilanes and acryloxysilanes. Examples of suitable alkoxysilanes include, but are not limited to trialkoxysilylureas, aminoalkyltrialkoxysilanes, chloroalkyltrialkoxysilanes, glycidoxyalkyltrialkoxysilanes, and isocyanoalkyltrialkoxysilanes. The optimum combinations of ferrocene derivatives and silane coupling agents can be chosen by those of ordinary skill in the art by prudent consideration of the chemical reactivities of the various ferrocene derivatives and silanes.

Although the non-ferrocene metallocenes previously listed do not require the use of a silane coupling agent, silanes may be advantageously employed with the non-ferrocene metallocenes in order to further enhance the properties of the reinforced thermoplastic compositions of the present invention. Thus, the typical alkoxysilane and acryloxysilanes listed above for use with the ferrocene derivatives may also be employed with the titanocenes, zirconocenes and hafnocenes.

Although the mechanism of interaction is not completely certain in every case, and applicant does not wish to be bound by any particular theory, it is thought that the ferrocene derivatives interact with the organic or carbon porion of the silanes, whereas the zirconocenes, titanocenes and hafnocenes are thought to interact with the silanol groups of the silanes. Thus, in the titanocenes, zirconocenes and hafnocenes the halide bonds to the transition metal may be displaced with silanol bonds, splitting out the alkoxy moieties. The purpose of this reaction is to allow more sites for reaction with glass fibers through the unreacted silanol bonds of the silane. Where no silane coupling agent is used, the halides are displaced to form direct siloxane linkages to the glass.

The amount of metallocene incorporated into a reinforced thermoplastic composite may vary widely, and will depend to a certain extent upon the manner of incorporation. If the metallocene is applied directly to the glass fibers, the total amount of metallocene present is preferably between about 0.05 and 1.0 weight percent of the total composite. If, on the other hand, the metallocene is added to the thermoplastic resin, or the composite premix, the total amount of metallocene present is preferably between about 0.2 and 3.0 weight percent.

The amount of silane coupling agent used in connection with a metallocene may also vary widely, and in the case of titanocenes, zirconocenes and hafnocenes may be completely omitted. For optimum cost and performance with any of the metallocenes, the silane coupling agent is preferably present in an amount of about 0.05 to 2.5 weight percent of the total composite. Thus, the total amount of coupling agent, including both silane and metallocene, may be up to about 5.5 weight percent. While greater amounts may be used if desired, the increase in cost is generally not warranted.

The metallocene coupling agent with or without a traditional silane coupling agent may be incorporated into the composite at various stages. For example, where it is desired to apply the coupling agent directly to the glass fibers, the coupling agent may be applied along with the standard sizing ingredients to glass roving before chopping. Alternatively, the coupling agent may be dissloved in a suitable solvent such as benzene and then added to the chopped glass fibers which are subsequently tumbled.

If desired, it is also suitable to mix the coupling agent directly into the thermoplastic resin before blending with the glass fibers, or into the thermoplastic resin/chopped glass premix prior to extrusion. Generally speaking, it is easier for a compounder to add the coupling agent to the premix prior to compounding. However, it is more efficient and effective to coat the fiberglass directly with the coupling agent, as is indicated above with the greater amounts of coupling agent being required when incorporating into the resin or resin-glass fiber premix.

The invention will now be illustrated in more detail with reference to the following specific, non-limiting examples. The physical properties of articles molded with the glass fiber reinforced thermoplastic compositions of the following examples were determined by the following ASTM standard tests for glass reinforced thermoplastics:

| Property: | ASTM test |
|---|---|
| Tensile strength and elongation | D638 |
| Flexural strength and modulus | D790 |
| Impact strength (notched and unnotched) | D256 |
| Heat distortion | D1822 |
| Mold shrinkage | D955 |

EXAMPLE I

Two premixes (i.e., tumbled blends of components employed directly in injection molding) were prepared one without a metallocene coupling agent and one with a metallocene. Each of the premixes was molded into ASTM shots. Both composites were prepared with polypropylene supplied by Avisun Corporation and Owens Corning Fiberglass designated P–59B (incorporated as sized chopped ¼″ fibers). The following properties were observed for the two composites:

| | A | B |
|---|---|---|
| Component, parts by weight: | | |
| Polypropylene | 70 | 70 |
| Fiberglas P–59B | 30 | 30 |
| Titanocene dichloride | 0 | 0.75 |
| Properties: | | |
| Tensile strength, p.s.i. | 8,100 | 11,560 |
| Elongation, percent | 2.8 | 3.1 |
| Izod impact, notched (¼″ bar) | 1.6 | 3.9 |
| Izod impact, unnotched (¼″ bar) | 6.2 | 9.8 |

From the above it is evident that titanocene dichloride effects an enhancement in the properties of polypropylene/glass fiber composites.

EXAMPLE II

As a further control ASTM shots were prepared as in Example I with neat polypropylene (i.e., polypropylene without any glass fibers). It was found that the addition of titanocene dichloride as in sample B of Example I did not substantially affect the physical properties of the resin. The tensile strength of both neat polypropylene resin samples was 4,600 p.s.i. under the same testing conditions as in Example I.

EXAMPLE III

A premix molding was prepared under the same conditions as in Example I except that gamma($\gamma$)-glycidoxypropyltrimethoxysilane manufactured by Dow Corning under the designation Z 6040 was also added. The composition and ASTM properties are as follows:

Components:
- Propylene _____ parts by weight__ 70
- Glass fiber _____ do____ 30
- Titanocene dichloride _____ do____ 0.5
- Z 6040 _____ do____ 0.5

Properties:
- Tensile strength, p.s.i. _____ 12,325
- Elongation, percent _____ 3.25
- Izod impact, notched ft. lbs./in. (¼″ bar) __ 5.1
- Izod impact, unnotched ft. lbs./in. (¼″ bar) _____ 8.7

It will be observed that a greater degree of enhancement is observed when incorporating a silane with the metallocene coupling agent. In addition, it may be noted that while some property improvement is obtained by addition of Z 6040 alone, the improvement is not substantial when compared with the use of titanocene dichloride alone as in sample B of Example I.

EXAMPLE IV

Extrusions (i.e. extruded blends of components in pellet form employed in injection molding) were prepared using a tumbled mix of the ingredients designated in Example III. No vacuum venting was employed in the extrusion. The amounts of each ingredient and the ASTM properties are listed below:

|  | A | B |
|---|---|---|
| Components, parts by weight: |  |  |
| Polypropylene | 80 | 80 |
| Fiberglas | 20 | 20 |
| Titanocene dichloride | 0.5 | 0 |
| Z 6040 | 0.5 | 0 |
| Properties: |  |  |
| Mold shrinkage, ⅛″ in./in | 0.001 | 0.004 |
| Tensile strength, p.s.i | 10,940 | 7,000 |
| Elongation, percent | 3.2 | 2–3 |
| Flexural strength, p.s.i | 13,500 | 8,600 |
| Flexural modulus, p.s.i | 580,000 | 525,000 |
| Izod impact, notched ft. lbs./in. (¼″ bar) | 2.0 | 1.2 |
| Izod impact, unnotched ft. lbs./in. (¼″ bar) | 6.0 | 5–6 |
| Heat distortion, 264 p.s.i., °F | 300 | 285 |

EXAMPLE V

A premix molding using zirconocene dichloride was prepared and tested. The resulting composite was off-white, in contrast with the red-brown composite produced with titanocene dichloride. The composition and properties are listed below:

Components:
- Polypropylene _____ parts by weight__ 80
- Glass fiber _____ do____ 20
- Zirconocene dichloride _____ do____ 0.5
- Z 6040 _____ do____ 0.5

Properties:
- Tensile strength, p.s.i. _____ 11,200
- Elongation, percent _____ 4.1
- Izod impact, notched, ft. lbs./in. (¼″ bar) __ 3.7
- Izod impact, unnotched ft. lbs./in. (¼″ bar) _____ 6.9

EXAMPLE VI

A methanol solution containing 5% titanocene dichloride and 5% gamma($\gamma$)-glycidoxypropyltrimethoxysilane was sprayed onto glass fiber roving designated P 673 by Owens Corning Fiberglas. The roving was subsequently dried and chopped into ¼″ lengths. After drying the total solids pickup was approximately 0.8%. A 30% glass fiber, 70% polypropylene premix composite was then prepared, and the following physical properties were observed.

Properties:
- Tensile strength, p.s.i. _____ 11,900
- Elongation, percent _____ 3.8
- Izod impact notched, ft. lbs./in. (¼″ bar) __ 2.9
- Izod impact unnotched, ft. lbs./in. (¼″ bar) _____ 8.0

EXAMPLE VII

Two premix formulations were prepared containing 20 parts by weight ¼″ chopped glass fibers designated 308A by Johns-Manville, and 80 parts by weight of polyvinylchloride made by Airco Chemical Company. Sample A was provided with 0.5 part by weight diaminoferrocene and 0.5 part by weight chloropropyltriethoxysilane, while sample B had no coupling agent. The properties of the two samples were as follows:

|  | A | B |
|---|---|---|
| Properties: |  |  |
| Tensile strength, p.s.i | 12,900 | 9,450 |
| Elongation, percent | 2.4 | 2.9 |
| Flexural strength, p.s.i | 16,860 | 13,520 |
| Flexural modulus, p.s.i | 842,000 | 795,000 |
| Izod impact, notched, ft. lbs./in. (¼″ bar) | 1.5 | 1.0 |
| Izod impact, unnotched, ft. lbs./in. (¼″ bar) | 6.8 | 5.0 |

EXAMPLE VIII

Two premix formulations were prepared containing thirty parts by weight of one quarter-inch chopped glass fibers designated 704.00 by Johns-Manville, and 70 parts by weight nylon 6 made by Monsanto Company. Sample A was provided with 0.5 part by weight ferrocene dicarboxylic acid and 0.3 part by weight of a polyamine functional silane designated Z 6050 and made by Dow Corning. Sample B did not contain any coupling agents. The properties of the two composites are as follows:

|  | A | B |
|---|---|---|
| Properties: |  |  |
| Tensile strength, p.s.i | 25,400 | 20,230 |
| Elongation, percent | 3.9 | 3.4 |
| Izod impact, notched ft. lbs./in. (¼″ bar) | 2.5 | 1.8 |
| Izod impact, unnotched ft. lbs./in. (¼″ bar) | 19.6 | 12.9 |

EXAMPLE IX

Two premix formulations were prepared containing twenty parts by weight of one-quarter inch chopped glass fibers made by Pittsburgh Plate Glass Company, and 80 parts by weight polystyrene made by Foster Grant Company, Inc. Sample A was provided with 0.75 part by weight titanocene dichloride and sample B did not contain any coupling agent. The properties of two composites are listed below:

|  | A | B |
|---|---|---|
| Properties: |  |  |
| Tensile strength, p.s.i | 12,540 | 11,350 |
| Elongation, percent | 2.0 | 2.0 |
| Izod impact, notched ft. lbs./in. (¼″ bar) | 2.7 | 1.8 |
| Izod impact, unnotched, ft. lbs./in. (¼″ bar) | 3.8 | 2.9 |

The present invention may be embodied in other specific forms without departing from the spirit or essential attributes thereof and, accordingly, reference should be made to the appended claims, rather than to the foregoing specification as indicating the scope of the invention.

I claim:

1. A reinforced thermoplastic composition comprising from about 40 to 95 weight percent of a thermoplastic resin, from about 5 to 60 weight percent of glass fibers, and from about 0.05 to 5.5 weight percent of a coupling agent, said coupling agent comprising at least one metallocene selected from the group consisting of titanocene dihalides, zirconocene dihalides, hafnocene dihalides, titanocene disulfonates, stable ring substituted derivatives of the foregoing, and combinations of a stable ring substituted ferrocene derivative with a silane, said silane being reactive with said stable ring substituted ferrocene derivative and being selected from the group consisting of alkoxysilanes and acryloxysilanes.

2. A reinforced thermoplastic composition according to claim 1 wherein said metallocene is selected from the group consisting of titanocene dihalides, hafnocene dihalides, zirconocene dihalides, titanocene disulfonates, and stable ring substituted derivatives thereof.

3. A reinforced thermoplastic composition according to claim 2 wherein said coupling agent is present in an amount of about 0.05 to 1 weight percent and is in the form of a coating on the glass fibers.

4. A reinforced thermoplastic composition according to claim 2 wherein said coupling agent is present in an amount of about 0.2 to 3 weight percent and is dispersed throughout the thermoplastic composition.

5. A reinforced thermoplastic composition according to claim 2 wherein said coupling agent also includes from about 0.05 to 2.5 weight percent of a silane selected from the group consisting of alkoxysilanes and acryloxysilanes.

6. A reinforced thermoplastic composition according to claim 5 wherein said silane is selected from the group consisting of trialkoxysilylureas, aminoalkyltrialkoxysilanes, glycidoxyalkyltrialkoxysilanes, acryloxysilanes, and isocyanoalkyltrialkoxysilanes.

7. A reinforced thermoplastic composition according to claim 5 wherein said thermoplastic resin is polypropylene and said metallocene is titanocene dichloride.

8. A reinforced thermoplastic composition according to claim 1 wherein said glass fibers are selected from the group consisting of continuous glass roving and chopped glass strand.

9. A reinforced thermoplastic composition according to claim 1 wherein said thermoplastic resin is selected from the group consisting of polypropylene, polystyrene, polyvinyl chloride, polyurethane, polyimides and nylon.

10. A reinforced thermoplastic composition according to claim 1 wherein said thermoplastic resin is polypropylene and said metallocene is titanocene dichloride.

11. A reinforced thermoplastic composition according to claim 1 wherein said metallocene is a combination of a stable ring substituted ferrocene derivative and a silane, and said silane is present in an amount of about 0.05 to 2.5 weight percent and is selected from the group consisting of trialkoxysilylureas, aminoalkyltrialkoxysilanes, glycidoxyalkyltrialkoxysilanes, acryloxysilanes, and isocyanoalkyltrialkoxysilanes.

12. A reinforced thermoplastic composition according to claim 11 wherein said ferrocene derivative is selected from the group consisting of ferrocenoyl chloride; ferrocene $1,1^1$ dicarboxylic acid; ferrocene $1,1^1$ diamine; $1,1^1$ di(chloromercuri) ferrocene; $1,1^1$ dihydroxymethyl ferrocene and $N,N^1$ dimethylaminomethyl ferrocene.

References Cited

UNITED STATES PATENTS

| 3,414,597 | 12/1968 | Wilkus et al. | 260—429.3 |
| 3,560,429 | 2/1971 | Bilow et al. | 117—126 GB |
| 3,649,660 | 3/1972 | Brown et al. | 260—429.3 |

LEWIS T. JACOBS, Primary Examiner

U.S. Cl. X.R.

117—126 GB; 260—37 N